United States Patent [19]

Yoshinaka et al.

[11] Patent Number: 4,723,459

[45] Date of Patent: Feb. 9, 1988

[54] POWER TRANSFER DEVICE FOR AUTOMOTIVE VEHICLES

[75] Inventors: Toshio Yoshinaka; Shuichiro Ida; Shuji Nagano; Toshikatsu Taniguchi, all of Toyota, Japan

[73] Assignee: Toyota Jidosha Kabushiki Kaisha, Japan

[21] Appl. No.: 860,984

[22] Filed: May 8, 1986

[30] Foreign Application Priority Data

May 11, 1985 [JP] Japan .................... 60-100002

[51] Int. Cl.[4] .................................... G05G 5/10
[52] U.S. Cl. .................... 74/477; 74/473 R; 74/665 GE
[58] Field of Search ............ 74/335, 477, 473 R, 74/665 F, 665 G, 665 GA, 665 GE, 674, 705, 665 T, 740, 785; 180/247

[56] References Cited

U.S. PATENT DOCUMENTS

| | | | |
|---|---|---|---|
| 2,017,101 | 10/1935 | Lapslely | 74/473 R |
| 2,228,581 | 1/1941 | Olen | 74/710.5 |
| 2,479,838 | 8/1949 | Huston | 74/665 GA |
| 2,887,201 | 5/1959 | Willis | 180/247 X |
| 3,221,574 | 12/1965 | Sampietro et al. | 74/665 |
| 3,310,992 | 3/1967 | Stott | 74/473 R |
| 3,431,791 | 3/1969 | Labat | 74/477 X |
| 3,788,164 | 1/1974 | Ojima | 74/665 T |
| 3,935,752 | 2/1976 | Kelbel et al. | 74/473 R |
| 3,955,442 | 5/1976 | Kessmar | 74/665 GE |
| 4,048,870 | 9/1977 | Hulsebusch | 74/473 R |
| 4,103,753 | 8/1978 | Holdeman | 180/247 |
| 4,138,906 | 2/1979 | Nakao et al. | 74/674 |
| 4,197,760 | 4/1980 | Wolfe | 74/477 |
| 4,270,409 | 6/1981 | Glaze et al. | 74/665 GA |
| 4,290,318 | 9/1981 | Ookubo et al. | 74/477 |
| 4,292,860 | 10/1981 | Kako et al. | 74/665 GA |
| 4,297,910 | 11/1981 | Myers | 74/473 R |
| 4,298,085 | 11/1981 | Moroto et al. | 180/247 |
| 4,299,140 | 11/1981 | Kako et al. | 74/665 G |
| 4,305,309 | 12/1981 | Ookubo et al. | 74/477 |
| 4,373,604 | 2/1983 | Lunn et al. | 180/247 |
| 4,381,828 | 5/1983 | Lunn et al. | 180/247 |
| 4,404,869 | 9/1983 | Numazawa et al. | 74/740 |
| 4,422,349 | 12/1983 | Matsumoto et al. | 74/665 GE |
| 4,440,042 | 4/1984 | Holdeman | 74/785 |
| 4,452,331 | 6/1984 | Lunn et al. | 180/247 |
| 4,458,557 | 7/1984 | Hayakawa | 74/665 GE |
| 4,476,952 | 10/1984 | Suzuki | 180/247 |
| 4,541,503 | 9/1985 | Akutagawa et al. | 180/247 |
| 4,559,846 | 12/1985 | Cochran et al. | 74/665 GA |
| 4,582,159 | 4/1986 | Suzuki | 180/247 |

FOREIGN PATENT DOCUMENTS

| | | |
|---|---|---|
| 0169361 | 3/1951 | Austria . |
| 0022632 | 1/1981 | European Pat. Off. . |
| 2515765 | 10/1982 | France . |
| 57-54333 | 11/1982 | Japan . |
| 949029 | 2/1964 | United Kingdom . |
| 1291257 | 10/1972 | United Kingdom . |
| 2103735 | 2/1983 | United Kingdom . |

Primary Examiner—Leslie Braun
Assistant Examiner—David Novais
Attorney, Agent, or Firm—Parkhurst & Oliff

[57] ABSTRACT

In a power transfer device including an input shaft rotatably mounted within a housing, a first output shaft rotatably supported on the housing for connecting the input shaft to a pair of front wheel drive axles, and a second output shaft arranged in parallel with the first output shaft and rotatably supported on the housing for drive connection to a pair of rear wheel drive axles, a shift mechanism includes a sleeve member axially slidable on the first output shaft between respective positions in which it effects a drive connection or disconnection between the output shafts, a shift rod arranged in parallel with the output shafts and axially movably supported on the housing, a shift fork mounted on the shift rod and coupled with the sleeve member, an operation rod extending through the peripheral wall of the housing and rotatably supported therethrough, the operation rod having an outer end operatively connected to a manual operation lever, and a swing arm secured to the inner end of the operation rod for rotation therewith and engaged at one end portion thereof with a recessed portion formed on the shift rod to restrict axial movement of the operation rod outwardly with respect to the housing and to restrict rotation of the shift rod.

5 Claims, 8 Drawing Figures

POWER TRANSFER DEVICE FOR AUTOMOTIVE VEHICLES

BACKGROUND OF THE INVENTION

1. Field of the Invention

The present invention relates to a power transfer device adapted for use in combination with a power transmission for a four wheel drive vehicle to transfer output drive torque of the power transmission to a pair of front road wheels and a pair of rear road wheels, and more particularly to a power transfer device capable of selectively providing either a two wheel drive or a four wheel drive.

2. Description of the Prior Art

There has been proposed a power transfer device of this kind which comprises a housing secured to one end of a transmission casing, an input shaft rotatably mounted within the housing and drivingly connected to an output shaft of the power transmission for the vehicle, a first output shaft arranged in parallel or coaxially with the input shaft for drive connection of the input shaft with front wheel or rear wheel drive axles, a second output shaft arranged coaxially or in parallel with the first output shaft for drive connection with rear wheel or front wheel drive axles, and a shift mechanism for selective connection or disconnection of the first output shaft to or from the second output shaft thereby to provide a four wheel drive or a two wheel drive.

In a Japanese Patent Publication No. 57-54333, for example, there has been proposed a shift mechanism in a power transfer device of this kind which shift mechanism includes a sleeve member axially slidably mounted on one of the first and second output shafts for connection or disconnection of the one output shaft to or from the other output shaft, a shift rod arranged in parallel with both the output shafts and axially movably supported on the peripheral wall of the housing, a shift fork mounted on the shift rod and coupled with the sleeve member for shifting the sleeve member in response to axial movement of the shift rod, an operation rod in the form of a cross-rod arranged perpendicularly to the shift rod and rotatably supported on the peripheral wall of the housing to be rotated by means of a manual operation lever, and a shift lever fixedly mounted on the operation rod for rotation therewith and being integrally provided with a swing arm which is engaged with the shift fork to effect axial movement of the shift rod in response to rotation of the operation rod.

In such a conventional shift mechanism as described above, there is provided a detent mechanism which cooperates with an interlock mechanism for selectively restricting the axial movement of the shift rod. The detent mechanism includes a spring loaded check ball selectively engageable with a pair of axially spaced recesses formed on the shift rod, and the interlock mechanism includes an interlock pin engageable with a recess formed on the shift rod. In the detent and interlock mechanisms, it is necessary to restrict rotation of the shift rod thereby to ensure selective engagement of the check ball and interlock pin with the respective recesses of the shift rod. For this reason, an additional arm is fixed to an intermediate portion of the shift rod and engaged with a stationary member in the transfer device to restrict the rotation of the shift rod. This inevitably causes the shift rod to be complicated in structure. Furthermore, axial movement of the operation rod outwardly with respect to the housing should be avoided to retain it in position. For this reason, the peripheral wall of the housing is formed to extend between boss portions respectively provided on the manual operation lever and on the shift lever so as to retain the operation rod in position. As a result of such arrangement as described above, both the side faces of the housing and each contact face of the boss portions should be machined with a required precision.

SUMMARY OF THE INVENTION

It is, therefore, a primary object of the present invention to provide an improved power transfer device wherein the shift rod is formed in such a manner that the rotation thereof and the aforesaid outward axial movement of the operation rod can be readily retained in position without requiring any special ancillary provisions therefor so as to make the shift rod simple in structure and minimizing the portions of the power transfer device parts needing to be precision machined.

According to the present invention, the primary object is accomplished by providing a power transfer device adapted for use in combination with a power transmission for an automotive vehicle, the shift mechanism of which transfer device includes a sleeve member axially slidably mounted on one of the output shafts between respective positions in which it effects a drive connection or disconnection between the first and second output shafts, a shift rod arranged in parallel with both the output shafts and axially movably supported on the peripheral wall of the housing, and a shift fork mounted on the shift rod for axial movement therewith and coupled with the sleeve member for shifting the sleeve member in response to the axial movement of the shift. The shift mechanism further comprises an operation rod extending through the peripheral wall of the housing and rotatably supported therethrough, the operation rod having an outer end operatively connected to a manual operation lever and an inner end located in the interior of the housing, and a swing arm secured to the inner end of the operation rod for rotation therewith. The shift rod is formed with a recessed portion which receives therein one end portion of the swing arm to restrict axial movement of the operation rod in a direction outwardly with respect to the housing and to restrict rotation of the shift rod.

In a practical embodiment of the present invention, the first output shaft is arranged coaxially with the input shaft and in parallel with the second output shaft, the sleeve member is mounted on the first output shaft, the shift mechanism further comprises a second sleeve member axially slidably mounted on the first output shaft between respective positions in which it effects a drive connection or disconnection between the input shaft and the first output shaft, a second shift rod arranged in parallel with the first-named shift rod and axially movably supported on the peripheral wall of the housing, and a second shift fork fixedly mounted on the second shift rod and coupled with the second sleeve member for shifting the second sleeve member in response to axial movement of the second shift rod. In such an arrangement as described above, the second shift fork is formed at a base portion thereof with a recessed portion which receives therein another end portion of the swing arm to restrict rotation of the second shift rod. Preferably, a change-speed mechanism is mounted on the input shaft to selectively provide a low speed drive power train or a high speed drive power train between the input shaft and the first output shaft, and the second sleeve member is arranged to effect a drive connection between the input shaft and the first output shaft through the change-speed mechanism.

BRIEF DESCRIPTION OF THE DRAWINGS

Additional objects, features and advantages of the present invention will be apparently understood from the following detailed description of the preferred embodiments thereof when taken in connection with the accompanying drawings, in which.

DESCRIPTION OF THE PREFERRED EMBODIMENTS

Figure 1:
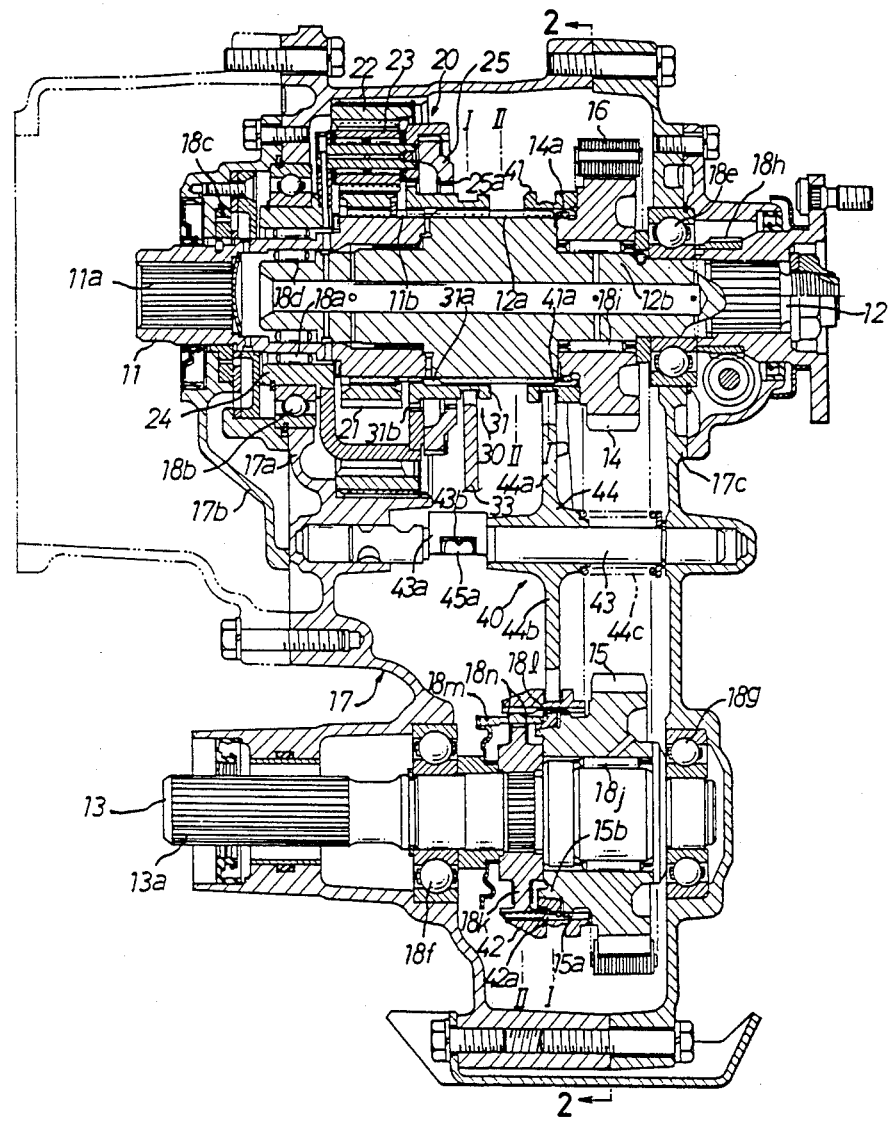
FIG. 1 is a full sectional view of a power transfer device in accordance with the present invention.

In FIG. 1 of the drawings, there is illustrated a power transfer device for a four wheel drive vehicle in accordance with the present invention, which transfer device includes a housing 17 to be secured to a right-hand end of a transmission casing, an input shaft 11, a first output shaft 12, a second output shaft 13, a drive sprocket 14, a driven sprocket 15, a drive chain 16, a planetary gear unit 20, a first shift mechanism 30 for selective provision of a high speed drive or a low speed drive, and a second shift mechanism 40 for selective provision of a two wheel drive or a four wheel drive.

The input shaft 11 is rotatably supported on a left-hand side wall 17a of housing 17 through a needle bearing 18a, a carrier 24 of planetary gear unit 20, and a ball bearing 18b. The input shaft 11 has an internally splined portion 11a for connection to an output shaft of a power transmission (not shown) in the transmission casing, and an externally splined portion 11b for mounting thereon the planetary gear unit 20. An oil pump 18c is mounted on the outer end portion of input shaft 11 and enclosed with a bearing retainer 17b fitted in a fluid-tight manner to the side wall 17a of housing 17 to supply lubricating oil to bearing portions and intermeshed portions in the transfer device.

The first output shaft 12 is arranged coaxially with input shaft 11 and rotatably supported within the right-hand end portion of input shaft 11 through a needle bearing 18d for relative rotation and on a right-hand side wall 17c of housing 17 through a ball bearing 18e. The first output shaft 12 is formed with an externally splined hub portion 12a and a journal portion 12b and is connected at the right-hand end thereof to rear wheel drive alxes (not shown). A drive gear 18h for a speedometer is fixedly mounted on the outer end portion of first output shaft 12.

The second output shaft 13 is arranged in parallel with input and first output shafts 11 and 12 and is rotatably supported by a pair of axially spaced ball bearings 18f and 18g mounted respectively on both side walls 17a and 17c of housing 17. The second output shaft 13 has an externally splined portion 13a at the left-hand end thereof for connection to front wheel drive axles (not shown). The drive sprocket 14 is rotatably supported on the journal portion 12b of first output shaft 12 through a needle bearing 18i, the driven sprocket 15 on second output shaft 13 being similarly supported through a needle bearing 18j. Both the drive sprocket 14 and driven sprocket 15 are drivingly connected to each other by means of the drive chain 16.

The planetary gear unit 20 is adapted as a change-speed mechanism for the transfer device, which comprises a sun gear 21 mounted in place on the externally splined portion 11b of input shaft 11 for rotation therewith, a stationary ring gear 22 arranged concentrically with sun gear 21 and secured to an internal cylindrical wall of housing 17, the carrier 24 rotatably arranged between sun gear 21 and ring gear 22, and a plurality of planetary gears rotatably supported by carrier 24 and in mesh with sun gear 21 and ring gear 22. An annular side gear 25 is integrally fixed to the right end of carrier 24 for rotation therewith and is formed with an internal spline 25a which is arranged to be engaged with a sleeve member 31 of the first shift mechanism 30. When the sleeve member 31 of first shift mechanism 30 is axially moved to engage the internal spline 25a of side gear 25 at its external spline 31b, the planetary gear unit 20 acts to transfer drive torque from the input shaft 11 to the first output shaft 12 therethrough at a predetermined reduction speed ratio.

Figure 2:
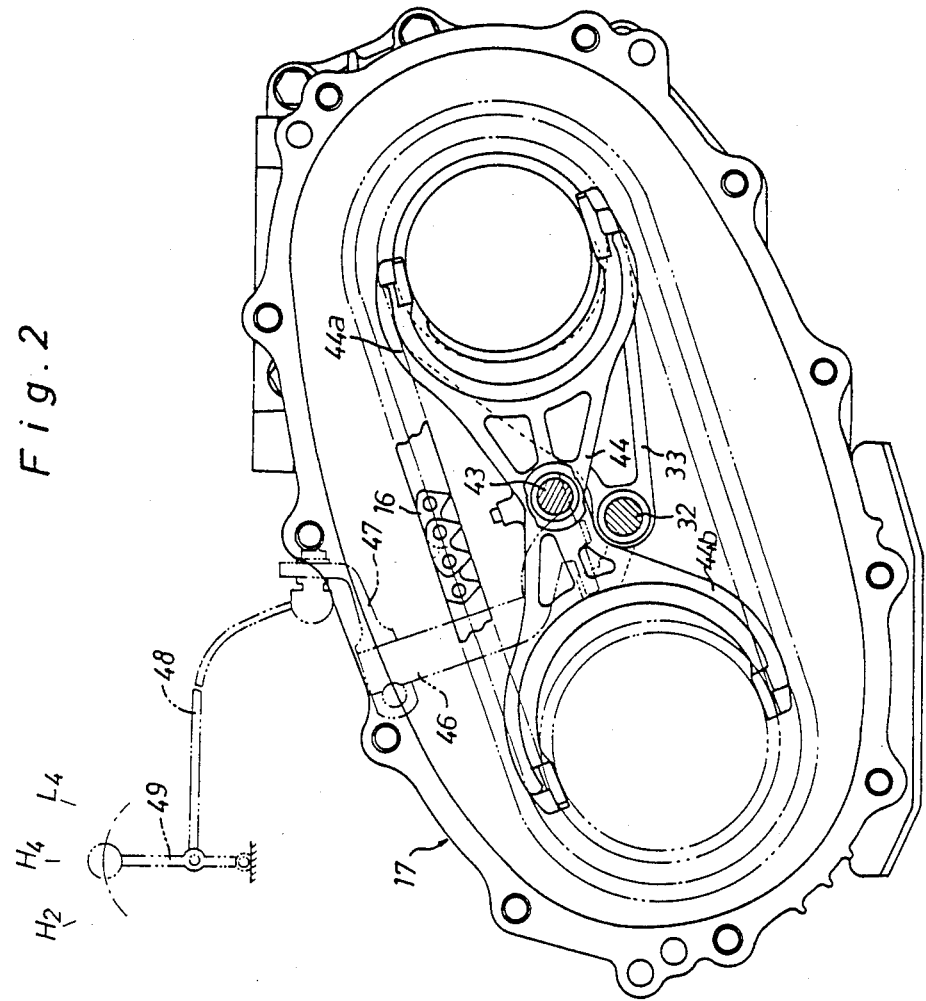
FIG. 2 is a side sectional view taken along line 2—2 in FIG. 1 with certain parts omitted to show the arrangement of both shift rods and the associated shift forks in the transfer device.
Figure 3:
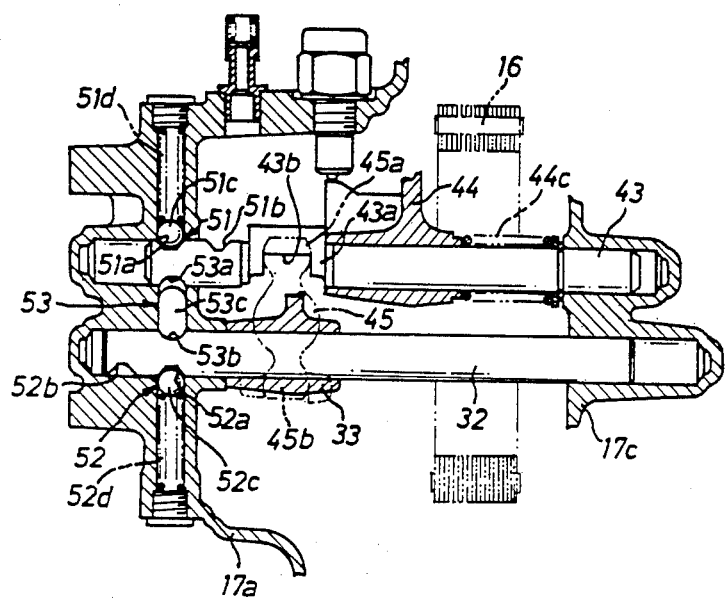
FIG. 3 is a sectional view with certain parts omitted to show the mounting of both the shift rods within a housing of the transfer device.

As is illustrated in FIGS. 1 to 4, the first shift mechanism 30 includes a shift rod 32 arranged in parallel with input and output shafts 11, 12, and a shift fork 33 fixed at a base portion thereof to an intermediate portion of shift rod 32 and coupled with the sleeve member 31. The sleeve member 31 has an internal spline 31a axially slidably engaged with the externally splined hub portion 12a of first output shaft 12 and engageable with the externally splined portion 11b of input shaft 11 when shifted rightward. As shown in FIG. 3, the shift rod 32 is axially slidably supported on both side walls 17a and 17c of housing 17 to be shifted by engagement with a swing arm 45 of the second shift mechanism 40. When the shift rod 32 is positioned to retain the shift fork 33 in a first position I, the sleeve member 31 is disengaged from the internal spline 25a of side gear 25 and engaged with the externally splined portion 11b of input shaft 11 to effect direct connection between input and output shafts 11 and 12. When the shift rod 32 is moved to shift the shift fork 33 to a second position II and retain it in the same position, the sleeve member 31 is disengaged from the externally splined portion 11b of input shaft 11 and engaged with the internal spline 25a of side gear 25 to drivingly connect the input shaft 11 to the first output shaft 12 through planetary gear unit 20.

As is illustrated in FIGS. 1 to 4, the second shift mechanism 40 includes a pair of sleeve members 41, 42, a shift rod 43 arranged between the output shafts 12, 13 and in parallel with the shift rod 32, a shift fork 44 axially slidably mounted on an intermediate portion of shift rod 43 and coupled with the sleeve members 41, 42, and an operation rod 46 integrally provided at its lower end with the swing arm 45. The first sleeve member 41 has an internal spline 41a axially slidably engaged with the externally splined hub portion 12a of first output shaft 12 and engageable with an external spline 14a formed on the left-hand end of drive sprocket 14. When the shift rod 43 is positioned to retain the shift fork 44 in a first position I, the first sleeve member 41 is engaged with the external spline 14a of drive sprocket 14 to rotate the drive sprocket 14 together with the first output shaft 12. When the shift rod 43 is moved to shift the shift fork 44 to a second position II and retain it in the same position, the first sleeve member 41 is disengaged from the external spline 14a of drive sprocket 14 to disconnect the drive sprocket 14 from the first output shaft 12.

The second sleeve member 42 has an internal spline 42a axially slidably engaged with an external spline of a clutch hub 18k which is fixedly mounted on the second output shaft 13. The internal spline 42a of sleeve member 42 is arranged to be engageable with an external spline 15a formed on the left-hand end of driven sprocket 15. When the shift rod 43 is positioned to retain the shift fork 44 in the first position I, the second sleeve member 42 is engaged with the external spline 15a of driven sprocket 15 to rotate the second output shaft 13 together with the driven sprocket 15. When the shift rod 43 is moved to shift the shift fork 44 to the second position II, the second sleeve member 42 is disengaged from the external spline 15a of driven sprocket 15 to disconnect the second output shaft 13 from the driven sprocket 15. Arranged at the inner circumference of second sleeve member 42 is a synchronizer assembly of well-known type, which includes a conical hub portion 15b integrally formed on the left-hand end of driven sprocket 15, a synchronizer ring 18 mounted on the conical portion 15b of driven sprocket 15, a strut key 18m, and a pair of retaining springs 18n. When the second sleeve member 42 is moved from the second position II to the first position I, the synchronizer assembly acts to establish a speed synchronization between the sprockets 14, 15, drive chain 16 and second output shaft 13.

Figure 4:
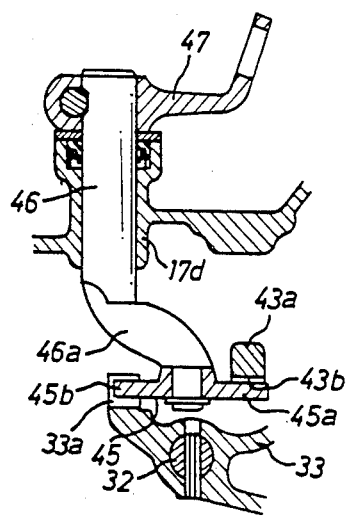
FIG. 4 is a sectional view with certain parts omitted to show the mounting of an operation rod.

As shown in FIG. 3, the shift rod 43 is axially slidably supported on both the side walls 17a, 17c of housing 17. The shift fork 44 is biased leftward by a compression coil spring 44c arranged about the shift rod 43 to resiliently abut against a stepped portion 43a formed on the shift rod 43 for its positioning. As shown in FIG. 2, the shift fork 44 is integrally formed with a pair of fork portions 44a, 44b which are engaged with respective sleeve members 41 and 42 to move them as a unit. The shift rod 43 is formed at the underside of stepped portion 43a thereof with a recessed portion 43b which is engaged one end portion 45a of swing arm 45. As shown in FIG. 4, the swing arm 45 is secured to an arm portion 46a formed at the lower end of operation rod 46 to be swung therewith, which operation rod 46 is inserted in a fluid-tight manner through a boss portion 17d of housing 17 and rotatably supported therethrough. In operation, the one end portion 45a of swing arm 45 is pressed into contact with a side face of recessed portion 43b of shift rod to cause axial movement of the shift rod 43, while another end portion 45b of swing arm 45 is engaged with a recessed portion 33a formed on the base portion of shift fork 33 to cause axial movement of the shift rod 32.

As shown in FIG. 3, a pair of opposed detent mechanisms 51, 52 and an interlock mechanism 53 are provided to selectively retain both the shift rods 32 and 43 in their shifted positions. The first detent mechanism 51 includes a check ball 51c loaded by a compression coil spring 51d toward the shift rod 43 and selectively engageable with a pair of axially spaced recesses 51a, 51b formed on the shift rod 43. The second detent mechanism 52 includes a check ball 52c loaded by a compression coil spring 52d toward the shift rod 32 and selectively engageable with a pair of axially spaced recesses 52a, 52b formed on the shift rod 32. The interlock mechanism 53 includes an interlock pin 53c selectively engageable with a pair of recesses 53a, 53b respectively formed on the shift rods 43 and 32. As shown in FIGS. 2 and 4, a connecting lever 47 is keyed to the outer end of operation rod 46 and is operatively connected to a manual operation lever 49 through a push-pull cable 48 in such a manner that the operation rod 46 is rotated by shifting operation of the manual operation lever 49 to swing the swing arm 45.

Figure 5A:
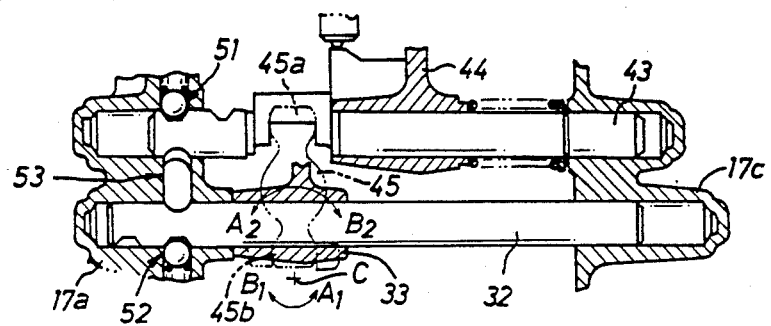
FIGS. 5(a) to 5(c) each are sectional views showing the operation of both the shift rods.

Assuming that the manual operation lever 49 is retained in a position H4 in FIG. 2 to provide a high speed four wheel drive, the sleeve member 31 is retained in the first position I to directly connect the input shaft 11 to the first output shaft 12, and both the sleeve members 41, 42 are respectively retained in the first position I to connect the first output shaft 12 to the drive sprocket 14 and to connect the second output shaft 13 to the driven sprocket 15. In such a condition, as shown in FIG. 5(a), the base portion of shift fork 33 is in abutment with an internal surface of the side wall 17a of housing 17 to restrict leftward movement of the shift rod 32, while an annular spring retainer fixed to the shift rod 43 is in abutment with an internal surface of the side wall 17c of housing 17 to restrict rightward movement of the shift rod 43. In FIG. 5(a), the reference character C indicates a center of the axis of operation rod 46.

Figure 5B:
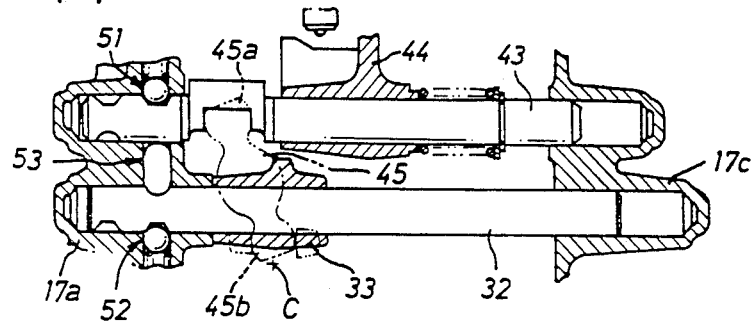

When the manual operation lever 49 is shifted from the position H4 to a position H2 in FIG. 2 to provide a high speed two wheel drive, the operation rod 46 is rotated in a direction shown by an arrow $A_1$ in FIG. 5(a) through the push-pull cable 48 and connecting lever 47. This causes a center of swing arm 45 to rotate in a direction shown by an arrow $A_2$ in FIG. 5(a). In this instance, as shown in FIG. 5(b), the one end portion 45a of swing arm 45 swings to move the shift rod 43 leftward, while the other end portion 45b of swing arm 45 acts as a fulcrum to effect the leftward movement of shift rod 43. Thus, the shift fork 44 is shifted to move both the sleeve members 41, 42 from the first position I to the second position II thereby to disengage the first output shaft 12 from the drive sprocket 14 as well as the second output shaft 13 from the driven sprocket 15. In such a condition as shown in FIG. 5(b), the interlock mechanism 53 acts to retain the shift rod 32 in place, and the detent mechanism 51 acts to retain the shift rod 43 in its shifted position. When the manual operation lever 49 is shifted from the position H2 to the position H4, the swing arm 45 is caused to swing in a reverse direction about the other end portion 45b to move the shift rod 43 rightward.

Figure 5C:
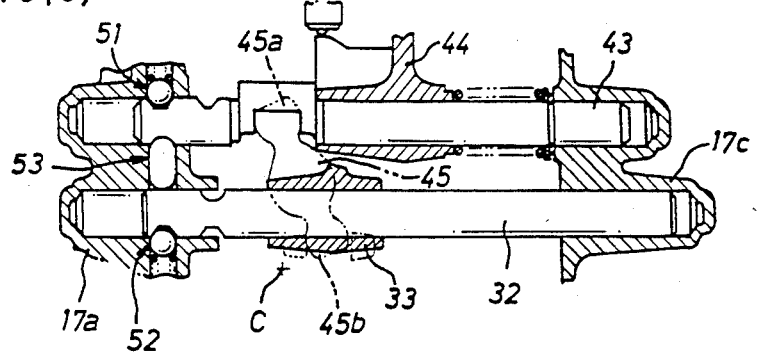

When the manual operation lever 49 is shifted from the position H4 to a position L4 in FIG. 2 to provide a low speed four wheel drive, the operation rod 46 is rotated in a direction shown by an arrow $B_1$ in FIG. 5(a) through the push-pull cable 48 and connecting lever 47. This causes the center of swing arm 45 to rotate in a direction shown by an arrow $B_2$. In this instance, as shown in FIG. 5(c), the other end portion 45b of swing arm 45 swings to move the shift fork 33 rightward, while the one end portion 45a of swing arm 45 acts as a fulcrum to effect the rightward movement of shift fork 33. Thus, the sleeve member 31 is caused to move to the second position II in FIG. 1 to connect the input shaft 11 to the first output shaft 12 through the planetary gear unit 20. In such a condition as shown in FIG. 5(c), the interlock mechanism 53 acts to retain the shift rod 43 in place, and the detent mechanism 52 acts to retain the shift rod 32 in its shifted position. When the manual operation lever 49 is shifted from the position L4 to the position H4, the swing arm 45 is caused to swing in a reverse direction about the one end portion 45a thereof to move the shift rod 32 leftward.

From the above description, it will be understood that the engagement of swing arm 45 at the one end portion thereof 45a with the recessed portion 43b of shift rod 43 and at the other end portion 45b thereof with the recessed portion 33a of shift fork 33 is effective to restrict rotation of the respective shift rods 43, 32 and to restrict axial movement of the operation rod 46 in a direction outwardly with respect to the housing 17. This enables the simplification of the construction of the shift mechanism 30, 40 and the reduction of portions of the component parts to be machined.

Figure 6:
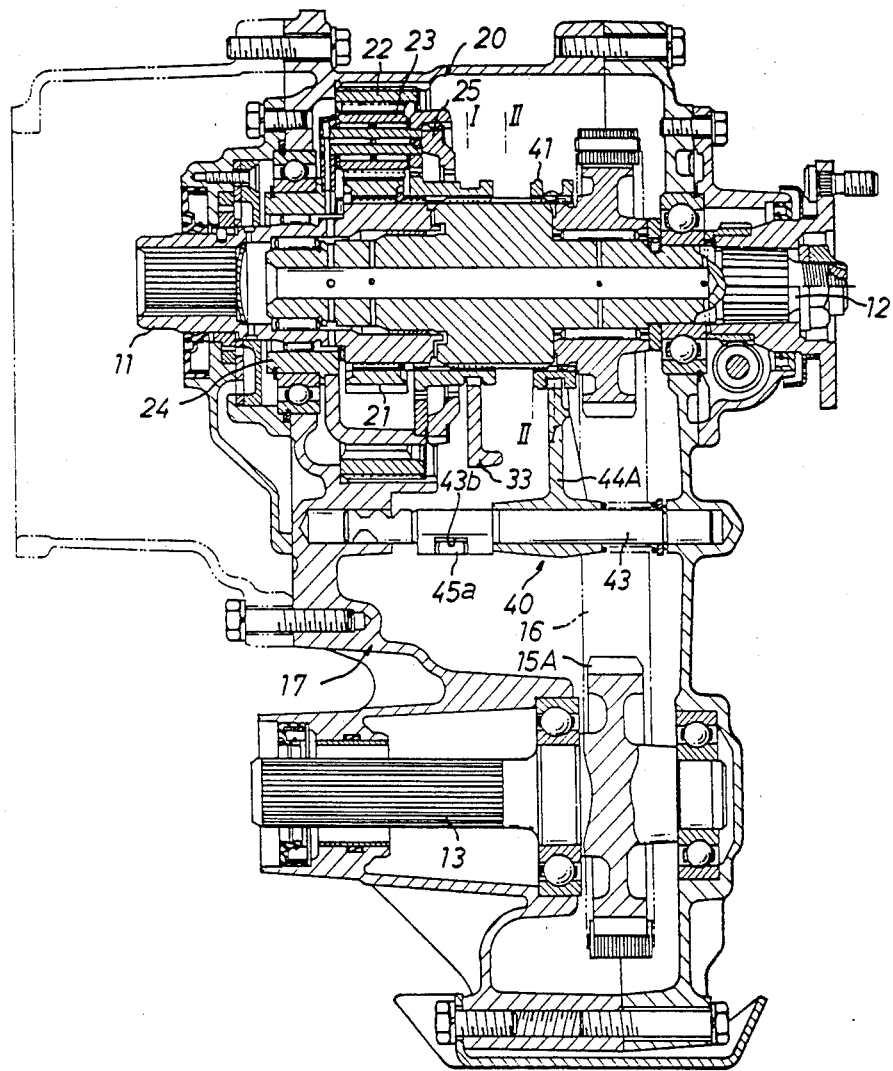
FIG. 6 is a full sectional view of a modification of the power transfer device.

In FIG. 6 there is illustrated a modification of the power transfer device, wherein the driven sprocket 15 is replaced with a driven sprocket 15A which is integrally mounted on the second output shaft 13 without provision of the sleeve member 42 and the synchronizer assembly, and wherein the shift fork 44 is replaced with a shift fork 44A which is axially slidably mounted on the shift rod 43 without provision of the other fork portion 46b. The other construction of the modification is substantially the same as that of the above-described embodiment. Thus, the modification has the same advantages as those of the above-described embodiment. In addition, it is noted that the present invention can be applied to a power transfer device of well-known type, which includes a first output shaft arranged in parallel with an input shaft for connecting the input shaft to a pair of front wheel or rear wheel drive axles, a second output shaft coaxially with the first output shaft for drive connection to a pair of rear wheel or front wheel drive axles, and a shift mechanism for selective connection or disconnection of the first output shaft to or from the second output shaft.

Having now fully set forth both structure and operation of certain preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device adapted for use in combination with a power transmission for an automotive vehicle, comprising:

a housing adapted to be secured to one end of a casing of said transmission;

an input shaft rotatably mounted within said housing and having an input end connectable to an output shaft of said transmission and having an output end;

a first output shaft rotatable supported on the peripheral wall of said housing for connecting the output end of said input shaft to a pair of front wheel or rear wheel drive axles of the vehicle;

a second output shaft arranged in parallel or coaxially with said first output shaft, rotatably supported on the peripheral wall of said housing, and having an output end for drive connection to a pair of rear wheel or front wheel drive axles of the vehicle; and a shift mechanism including a sleeve member axially slidably mounted on one of said output shafts between respective positions in which it effects a drive connection or disconnection between said first and second output shafts, a shift rod arranged in parallel with both said output shafts and axially movably supported on the peripheral wall of said housing, and a shift fork mounted on said shift rod for axial movement therewith and coupled with said sleeve member for shifting said sleeve member in response to the axial movement of said shift rod;

wherein said shift mechanism further comprises an operation rod extending through the peripheral wall of said housing and rotatably supported therethrough, said operation rod having an outer end operatively connected to a manual operation lever and an inner end located in the interior of said housing, and a swing arm secured to the inner end of said operation rod for rotation therewith, and wherein said shift rod is formed with a recessed portion which receives therein one end portion of said swing arm to restrict axial movement of said operation rod in a direction outwardly with respect to said housing and to restrict rotation of said shift rod in both directions about its axis.

2. A power transfer device as recited in claim 1, wherein said shift rod is formed at an intermediate portion thereof with a stepped portion forming therein said recessed portion for engagement with one end portion of said swing arm, and wherein said shift fork is axially slidably mounted on said shift rod and resiliently in abutment against the stepped portion of said shift rod under load of a compression coil spring arranged about said shift rod.

3. A power transfer device as recited in claim 1, wherein said first output shaft is arranged coaxially with said input shaft and in parallel with said second output shaft, and said sleeve member is mounted on said first output shaft, wherein said shift mechanism further comprises a second sleeve member axially slidably mounted on said first output shaft between respective positions in which it effects a drive connection or disconnection between said input shaft and said first output shaft, a second shift rod arranged in parallel with said first-named shift rod and axially movably supported on the peripheral wall of said housing, and a second shift fork fixedly mounted on said second shift rod and coupled with said second sleeve member for shifting said second sleeve member in response to axial movement of said second shift rod, and wherein said second shift fork is formed at a base portion thereof with a recessed portion which receives therein another end portion of said swing arm to restrict rotation of said second shift rod.

4. A power transfer device as recited in claim 3, wherein a change-speed mechanism is mounted on said input shaft to selectively provide a low speed drive power train or a high speed drive power train between said input shaft and said first output shaft, and wherein said second sleeve member is arranged to effect a drive connection between said input shaft and said first output shaft through said change-speed mechanism.

5. A power transfer device adapted for use in combination with a power transmission for an automotive vehicle, comprising:

a housing adapted to be secured to one end of a casing of said transmission;

an input shaft rotatably mounted within said housing and having an input end connectable to an output shaft of said transmission and having an output end;

a first output shaft arranged coaxially with said input shaft and rotatably supported on the peripheral wall of said housing for connecting the output end of said input shaft to a pair of front wheel or rear wheel drive axles of the vehicle;

a second output shaft arranged in parallel with said first output shaft, rotatably supported on the peripheral wall of said housing, and having an output end for drive connection to a pair of rear wheel or front wheel drive axles of the vehicle;

a drive sprocket rotatably mounted on said first output shaft;

a driven sprocket rotatably mounted on said second output shaft and being drivingly connected with said drive sprocket;

a shift mechanism including a first sleeve member axially slidably mounted on said first output shaft between respective positions in which it effects a drive connection or disconnection between said drive sprocket and said first output shaft, a second sleeve member axially slidably mounted on said second output shaft between respective positions in which it effects a drive connection or disconnection between said driven sprocket and said second output shaft, a shift rod arranged in parallel with both said output shafts and axially movably supported on the peripheral wall of said housing, and a shift fork mounted on said shift rod for axial movement therewith and coupled with said first and second sleeve means for shifting both said sleeve members in response to the axial movement of said shift rod;

wherein said shift mechanism further comprises an operation rod extending through the peripheral wall of said housing and rotatably supported therethrough, said operation rod having an outer end operatively connected to a manual operation lever and an inner end located in the interior of said housing, and a swing arm secured to the inner end of said operation rod for rotation therewith, and wherein said shift rod is formed with a recessed portion having its mouth facing in the same direction as that in which said operation rod extends into said housing, for receiving therein one end portion of said swing arm in such a manner that said swing arm is arranged to shift said shift rod by engagement therewith in response to rotation of said operation rod, to restrict rotation of said shift rod in both directions about its axis and to restrict axial movement of said operation rod in a direction outwardly with respect to said housing.

* * * * *